(12) United States Patent
Das et al.

(10) Patent No.: US 8,634,662 B2
(45) Date of Patent: Jan. 21, 2014

(54) DETECTING RECURRING EVENTS IN CONSUMER IMAGE COLLECTIONS

(75) Inventors: Madirakshi Das, Penfield, NY (US); Alexander C. Loui, Penfield, NY (US)

(73) Assignee: Apple Inc., Cupertino, CA (US)

( * ) Notice: Subject to any disclaimer, the term of this patent is extended or adjusted under 35 U.S.C. 154(b) by 605 days.

(21) Appl. No.: 12/862,806

(22) Filed: Aug. 25, 2010

(65) Prior Publication Data

US 2012/0051644 A1 Mar. 1, 2012

(51) Int. Cl.
*G06K 9/62* (2006.01)
(52) U.S. Cl.
USPC .......................... 382/225; 382/305; 707/737
(58) Field of Classification Search
USPC .......... 382/224–228, 305, 306; 707/736–757, 707/E17.004, E17.019–E17.031
See application file for complete search history.

(56) References Cited

U.S. PATENT DOCUMENTS

| | | | |
|---|---|---|---|
| 6,351,556 | B1 | 2/2002 | Loui et al. |
| 6,606,411 | B1 * | 8/2003 | Loui et al. .............. 382/224 |
| 6,915,011 | B2 * | 7/2005 | Loui et al. .............. 382/224 |
| 7,421,449 | B2 * | 9/2008 | Williams et al. ............... 1/1 |
| 7,636,733 | B1 | 12/2009 | Rothmuller |
| 7,716,194 | B2 * | 5/2010 | Williams et al. .............. 707/705 |
| 7,788,592 | B2 * | 8/2010 | Williams et al. .............. 715/764 |
| 8,028,249 | B2 * | 9/2011 | Loui et al. .............. 715/835 |
| 2003/0033296 | A1 * | 2/2003 | Rothmuller et al. .............. 707/3 |
| 2005/0044066 | A1 * | 2/2005 | Hooper et al. .............. 707/3 |
| 2006/0090141 | A1 * | 4/2006 | Loui et al. .............. 715/764 |
| 2006/0155757 | A1 * | 7/2006 | Williams et al. .......... 707/103 R |
| 2006/0156237 | A1 * | 7/2006 | Williams et al. .............. 715/720 |
| 2006/0156245 | A1 * | 7/2006 | Williams et al. .............. 715/764 |
| 2006/0156246 | A1 * | 7/2006 | Williams et al. .............. 715/764 |
| 2007/0008321 | A1 * | 1/2007 | Gallagher et al. ............. 345/473 |
| 2008/0256577 | A1 * | 10/2008 | Funaki et al. ................... 725/44 |
| 2009/0113350 | A1 * | 4/2009 | Hibino et al. ................. 715/853 |

FOREIGN PATENT DOCUMENTS

WO 2009/150425 12/2009

OTHER PUBLICATIONS

Event Detection from Flickr Data through Wavelet-based Spatial Analysis, Ling Chen & Abhishek Roy, Proceeding of the 18th ACM Conference on Information and Knowledge Management, CIKM 2009, Jan. 1, 2009, p. 523-532.
Gallagher et al, Image Annotation Using Personal Calendars as Context, ACM Intl. Conf. on Multimedia 2008.
Han et al, Data Mining Concepts and Techniques, Elsevier 2006, p. 418-420.
Das et al, Event Classification in Personal Image Collections, IEEE Intl. Workshop on Media Information Analaysis for Personal and Social Applications at ICME 2009.
Das et al, Event-based Location Matching for Consumer Image Collections, Proc. of the ACM Int. Conf. on Image and Video Retrieval, 2008.
International Search Report and Written Opinion received in corresponding PCT Application No. PCT/US2011/048169, dated Oct. 21, 2011.

* cited by examiner

*Primary Examiner* — Aaron W Carter
(74) *Attorney, Agent, or Firm* — Wong, Cabello, Lutsch, Rutherford & Brucculeri, LLP (57) ABSTRACT

A method of detecting recurring events in a digital image collection taken over a pre-determined period of time is disclosed. The method uses a processor for analyzing the digital image collection to produce a two-dimensional representation of the distribution of image capture activity over time and detecting recurring events by identifying spatial clusters in the two-dimensional representation.

17 Claims, 6 Drawing Sheets

DETECTING RECURRING EVENTS IN CONSUMER IMAGE COLLECTIONS

FIELD OF THE INVENTION

The invention relates generally to the field of digital image processing, and in particular to a method for identifying groups of digital images that portray recurring events in consumer image collections.

BACKGROUND OF THE INVENTION

With the ubiquitous presence of digital cameras and camera phones, people capture large numbers of images and videos to mark events important to them. The highlights of such events are then shared online to be accessed by the user's social networks. Large digital media collections accumulated over time contain a wealth of information that can be useful to understand individual users as well as groups of people. Temporal information is valuable for information management and retrieval in general, enhancing search and browsing applications. Analyzing the content and timing of a user's media in a collection that spans several years can yield dates of importance and a view into the user's interests. This knowledge can enable organization of the personal collection, sharing with contacts, as well as personalized and well-timed advertising. For example, if evidence from a user's personal photo collection suggests that he/she regularly takes a vacation during a school break in March, the images in this group can be organized appropriately with links to previous years' vacations. Travel and tourism-related advertising can be targeted to fall within the planning phase of this time period, and the images can be shared with contacts with which the user regularly shares this type of images.

Attempting to identify some of these events using a generic calendar of important dates can detect a limited number of events, and none of the user-specific special dates (e.g. birthdays) can be detected in this manner. Also, this approach makes an assumption that the user actually celebrates the same holidays as the region they are in, when in reality there would need to be a different calendar for each group of people in a diverse population. In addition to differences in calendar due to cultural differences, the location of the user also contributes local events to the calendar e.g. Lilac Festival in Rochester, N.Y., International Balloon Fiesta in Albuquerque, N. Mex. In response to these problems, there has been work in associating users' captured images with their personal calendars (e.g. "Image Annotation Using Personal Calendars as Context", Gallagher et al, ACM Intl. Conf. on Multimedia 2008). However, notations on personal calendars often relate to appointments and work tasks that are not associated with picture-taking.

There has been work in grouping images into events. U.S. Pat. No. 6,606,411 by Loui and U.S. Pat. No. 6,351,556 by Loui, disclose algorithms for clustering image content by temporal events and sub-events. According to U.S. Pat. No. 6,606,411 events have consistent color distributions, and therefore, these pictures are likely to have been taken with the same backdrop. For each sub-event, a single color and texture representation is computed for all background areas taken together. The above two patents teach how to cluster images and videos in a digital image collection into temporal events and sub-events. The terms "event" and "sub-event" are used in an objective sense to indicate the products of a computer mediated procedure that attempts to match a user's subjective perceptions of specific occurrences (corresponding to events) and divisions of those occurrences (corresponding to sub-events). Another method of automatically organizing images into events is disclosed in U.S. Pat. No. 6,915,011 by Loui et al. The events detected are chronologically ordered in a timeline from earliest to latest.

Using the above methods, a reduction can be made in the amount of browsing required by the user to locate a particular event by viewing representatives of the events along a timeline, instead of each image thumbnail. However, due to the large temporal separation of related events (such as birthdays), these event groups are spaced far apart on the timeline and are not easy to visualize as a group. Therefore, a need exists to detect groups of images that are semantically related to each other but are temporally separated by long time differences.

SUMMARY OF THE INVENTION

In accordance with the present invention, there is provided a method of detecting recurring events in a digital image collection taken over a pre-determined period of time comprising, using a processor for:

(a) analyzing the digital image collection to produce a multi-dimensional representation of the distribution of image capture activity over time; and (b) detecting recurring events by identifying spatial clusters in the multi-dimensional representation. The similarity between events can also be taken into consideration during the clustering process.

In this invention, a framework for mining temporal recurring events from multi-year consumer collections is described. Collections are described in terms of events that are represented in an appropriate multi-dimensional space. Density-based clustering at different neighborhood sizes is used, filtering the neighborhood based on event characteristics to reduce the number of false matches in the group. An event signature based on event classification, location, and temporal characteristics is created to characterize events. This invention detects personal special dates such as birthdays and anniversaries, seasonal activities and holidays celebrated customized to a user's personal collection.

The present invention, for example, is applicable for two of the commonly occurring classes of calendar-based recurring events in consumer collections—events that typically occur around the same date every year, e.g., birthdays, anniversaries, and some holidays; and events that are loosely tied to the calendar date. Although events in this second class have similar temporal characteristics, the exact date is often not followed year-over-year. These include holidays that do not follow the exact date, e.g., those that are on a certain day of the week during a specified week and month (such as Labor Day in the US; Mother's Day), and those that are computed from the phase of the moon or sun (such as many Asian religious and cultural festivals). In addition, there are regular vacations (e.g., during school breaks), parties/gatherings (to celebrate calendar-based events but moved to a convenient weekend instead of the exact date), and sporting events, which also fall in this category of loosely being related to the calendar but not on a specific date.

The organization and retrieval of images and videos is a problem for the typical consumer. It is useful for the user to be able to browse an overview of important events in their collection. Technology disclosed in prior art permits the classification of images in a collection into events, but not the ability to associate related events when they are temporally separated. This invention is effective in detecting recurring events that typically occur around the same date every year and events that are loosely associated with the calendar date.

This includes personal special dates such as birthdays and anniversaries, seasonal activities and holidays celebrated, that is customized to the user whose collection is being analyzed.

DETAILED DESCRIPTION OF THE INVENTION

The present invention can be implemented in computer systems as will be well known to those skilled in the art. In the following description, some embodiments of the present invention will be described as software programs. Those skilled in the art will readily recognize that the equivalent of such a method can also be constructed as hardware or software within the scope of the invention.

Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Figure 1:
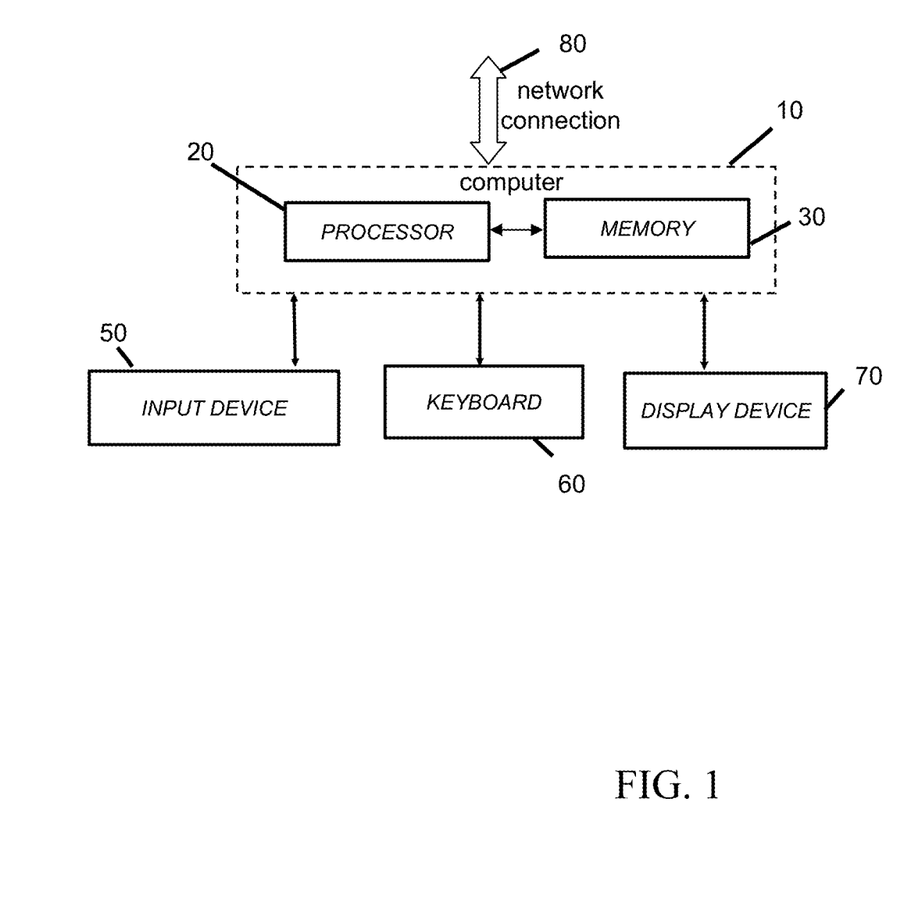
FIG. 1 is a block diagram of a system that practices the present invention.

The present invention can be implemented in computer hardware and computerized equipment. For example, the method can be performed in a digital camera, a multimedia smart phone, a digital printer, on an internet server, on a kiosk, and on a personal computer. Referring to FIG. 1, there is illustrated a computer system for implementing the present invention. Although the computer system is shown for the purpose of illustrating a preferred embodiment, the present invention is not limited to the computer system shown, but can be used on any electronic processing system such as found in digital cameras, home computers, kiosks, or any other system for the processing of digital images. A computer 10 includes a microprocessor-based unit 20 (also referred to herein as a processor) for receiving and processing software programs and for performing other processing functions. A memory unit 30 stores user-supplied and computer-generated data which can be accessed by the processor 20 when running a computer program. A display device (such as a monitor) 70 is electrically connected to the computer 10 for displaying information and data associated with the software, e.g., by a graphical user interface. A keyboard 60 is also connected to the computer 10. As an alternative to using the keyboard 60 for input, a mouse can be used for moving a selector on the display device 70 and for selecting an item on which the selector overlays, as is well known in the art. Input devices 50 such as compact disks (CD) and DVDs can be inserted into the computer 10 for inputting the software programs and other information to the computer 10 and the processor 20. Still further, the computer 10 can be programmed, as is well known in the art, for storing the software program internally. In addition, media files (such as images, music and videos) can be transferred to the memory unit 30 of the computer 10 by use of input devices 50 such as memory cards, thumb drives, CDs and DVDs, or by connecting a capture device (such as camera, cell phone, video recorder) directly to the computer 10 as an input device. The computer 10 can have a network connection, such as a telephone line or wireless connection 80, to an external network, such as a local area network or the Internet. Software programs and media files can be transferred to the computer 10 from other computers or the Internet through the network connection.

It should also be noted that the present invention can be implemented in a combination of software or hardware and is not limited to devices which are physically connected or located within the same physical location. One or more of the devices illustrated in FIG. 1 can be located remotely and can be connected via a network. One or more of the devices can be connected wirelessly, such as by a radio-frequency link, either directly or via a network.

The invention has been described in detail with particular reference to certain preferred embodiments thereof, but it will be understood that variations and modifications can be effected within the spirit and scope of the invention. Videos in a collection are included in the term "images" in the rest of the description.

Figure 2:
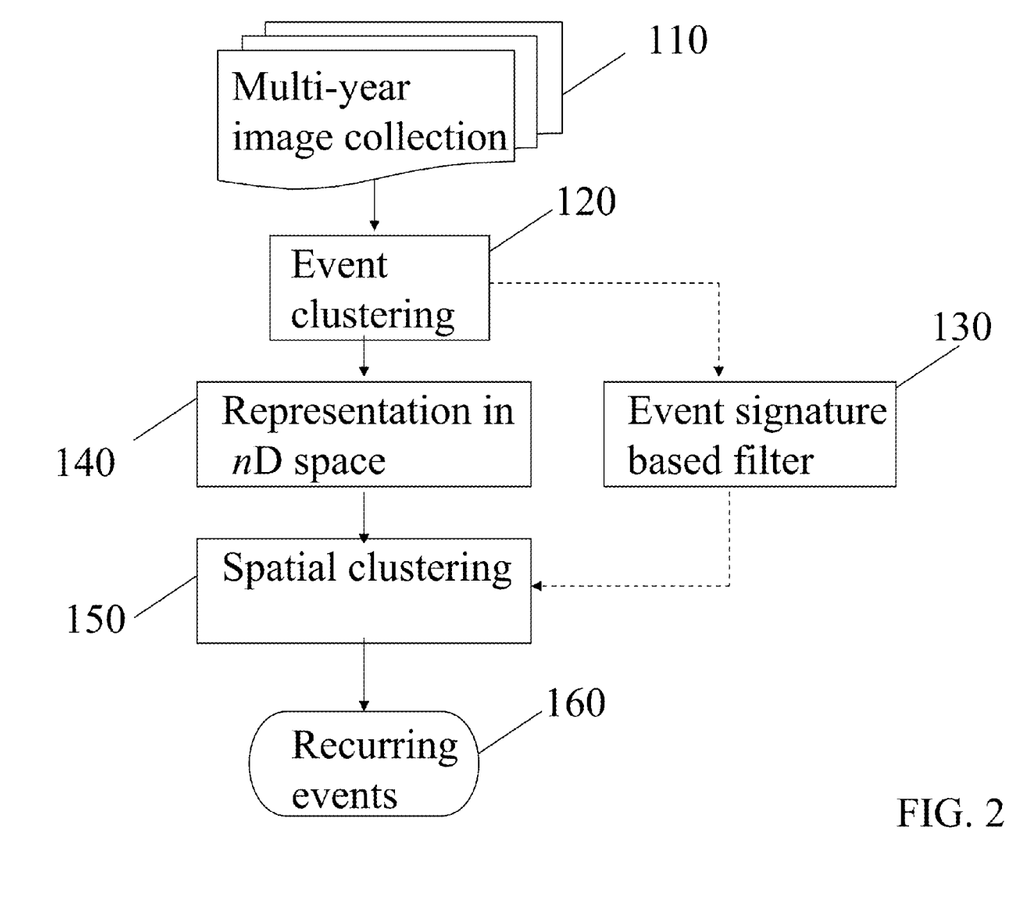
FIG. 2 is an overall flowchart of the method of the present invention.

Referring to FIG. 2, a user's multi-year digital image collection 110 resides in the memory unit 30 of the computer 10. In the preferred embodiment, the digital image collection 110 spans at least 5 years of time. The other blocks in the figure are implemented by a software program and are executed by the processor 20 of the computer 10. The digital image collection 110 is provided to an event clustering algorithm 120 that groups the images in the digital image collection 110 into temporal events. In the preferred embodiment, the event and sub-event detector described in U.S. Pat. No. 6,606,411, by Loui and U.S. Pat. No. 6,351,556 by Loui are used. According to U.S. Pat. No. 6,606,411 events have consistent color distributions, and therefore, these pictures are likely to have been taken with the same backdrop. For each sub-event, a single color and texture representation is computed for all background areas taken together. The above two patents teach how to cluster images and videos in a digital image collection into temporal events and sub-events. The terms "event" and "sub-event" are used in an objective sense to indicate the products of a computer mediated procedure that attempts to match a user's subjective perceptions of specific occurrences (corresponding to events) and divisions of those occurrences (corresponding to sub-events). Briefly summarized, a collection of images is classified into one or more events determining one or more largest time differences of the collection of images based on time or date clustering of the images and separating the plurality of images into the events based on having one or more boundaries between events where one or more boundaries correspond to the one or more largest time differences. For each event, sub-events can be determined (if any) by comparing the color histogram information of successive images as described in U.S. Pat. No. 6,351,556. This is accomplished by dividing an image into a number of blocks and then computing the color histogram for each of the blocks. A block-based histogram correlation procedure is used as described in U.S. Pat. No. 6,351,556 to detect sub-event boundaries. Another method of automatically organizing images into events is disclosed in U.S. Pat. No. 6,915,011 by Loui et al, which is herein incorporated by reference. Briefly summarized, according to one aspect of the above invention, an event clustering method uses foreground and background segmentation for clustering images from a group into similar events. Initially, each image is divided into a plurality of blocks, thereby providing block-based images. Using a block-by-block comparison, each block-based image is segmented into a plurality of regions including at least a foreground and a background. One or more luminosity, color, position or size features are extracted from the regions and the extracted features are used to estimate and compare the similarity of the regions including the foreground and background in successive images in the group. Then, a measure of the total similarity between successive images is computed, thereby providing image distance between successive images, and event clusters are delimited from the image distances.

Figure 4:
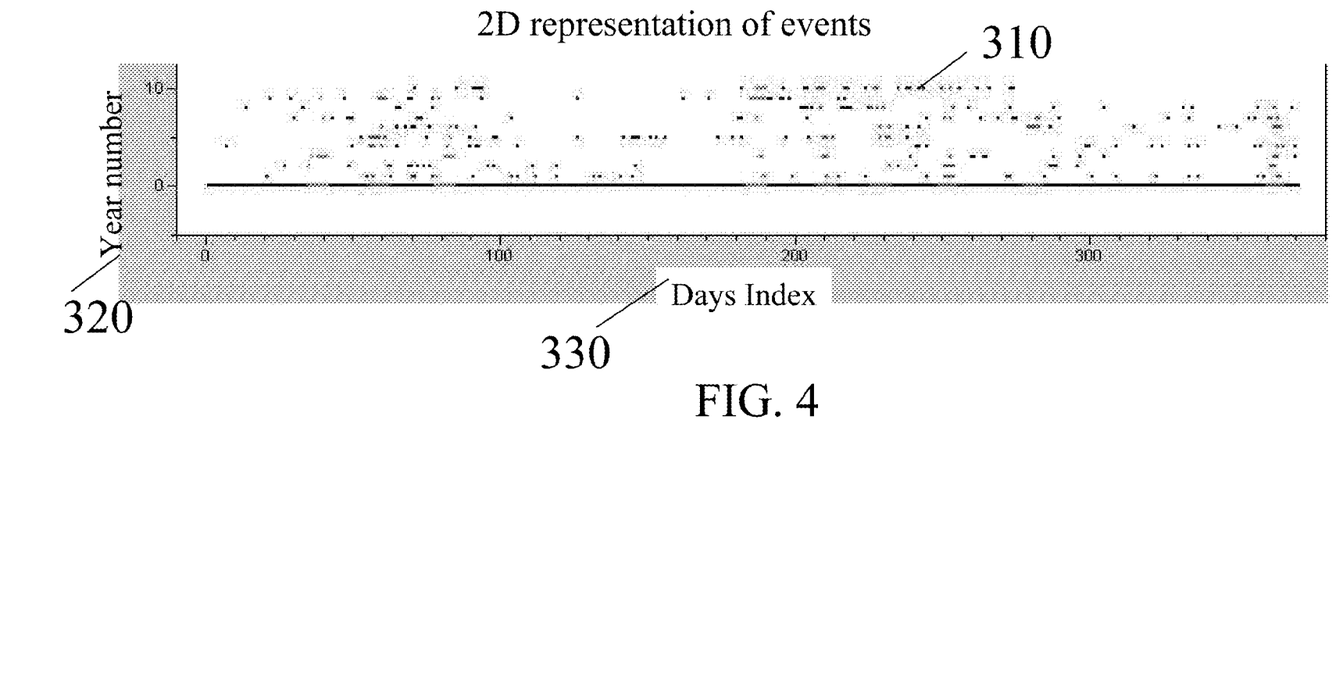
FIG. 4 shows a specific example of the 2D representation of events produced in accordance with the present invention.
Figure 5:
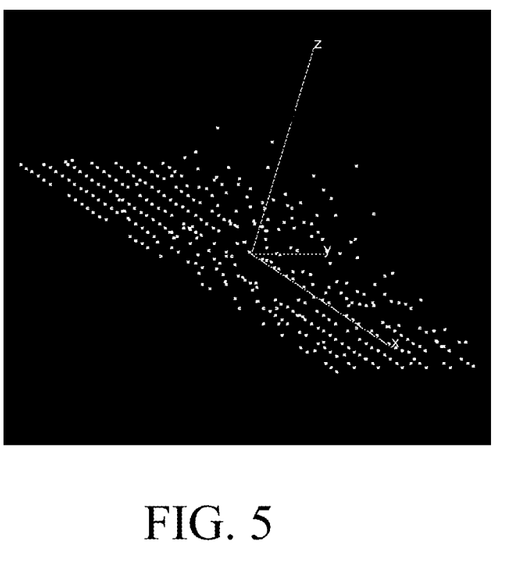
FIG. 5 shows a specific example of a 3D representation of events produced in accordance with the present invention.

Referring to FIG. 2, the events detected in event clustering algorithm 120 are represented 140 in a multi-dimensional space. In one embodiment, a 2D space is used as illustrated in FIG. 4. Referring to FIG. 4, each event forms an event point 310 in the space defined by the year number on the y-axis 320 and the day of the year on the x-axis 330, also referred to as event points in this application. The years are simply numbered chronologically to generate the year number e.g. if the collection spans 2005 to 2010, 2005 would correspond to year number 1, 2006 to year number 2 and so on with 2010 corresponding to year number 6. The day of the year is counted from the beginning of the year with January 1st as day 1. February 29th, if occurring in the year, is currently ignored in the count so that dates in consecutive years correspond to the same day of the year. Representing events in this 2D-space places potentially recurring events in spatial proximity with each other, spatial clustering methods can be used to find groups of events. The events can also be represented in multi-dimensional space, where the number of dimensions, n, is more than 2. Other event characteristics such as event type or event size can be used as additional axes to further localize events spatially by their characteristics. In another embodiment, the week of year and day of the week are used as the x-axis and y-axis respectively. FIG. 5 shows an example of this embodiment with the year number as the z-axis, creating a 3-dimensional representation. The week of year refers to the sequential number of the week starting with the first week of the year as 1. The last week of the year is week 53 when the first and last weeks are partial weeks. The day of the week are numbered sequentially from −3 to +3 (including 0) starting with Monday. This representation is useful for detecting recurring events that are associated with the day of the week e.g. school sporting leagues, regular weekly gatherings, Easter, Thanksgiving and other holidays.

Referring to FIG. 2, spatial clustering 150 is performed on the event representation in the multi-dimensional space generated in 140. In the preferred embodiment, the density-based clustering approach (Data Mining Concepts and Techniques by Han and Kamber, Elsevier, 2006, pg. 418-420) is used for generating spatial clusters. This algorithm grows regions with sufficiently high point density into clusters. In our embodiment, the neighborhood around any given central event point (x, y) is defined as (x±2, y±2) for detecting events closely tied to the calendar date. Core objects are identified that have greater than a threshold of points (5 points in this embodiment) in their neighborhood. The density-based clustering algorithm iteratively collects directly density-reachable objects from these core objects, terminating when no new points can be added. For detecting recurring events that are loosely associated with the calendar, a larger neighborhood of (x±7, y±2) is selected around the central event point (x, y) with the same threshold (5 points) for qualifying as a core point. However, only event points 310 that pass the event signature filtering process described in the next paragraph are included to compute the neighborhood points for any given event point 310.

Referring to FIG. 2, filtering based on event signature 130 can be used to refine the spatial clustering 150. This additional step is especially useful when using larger neighborhoods or when detecting recurring events within a year. The event signature 130 is used as a filter to determine whether points can be considered to be in the same neighborhood as any given central event point 310. The event signature 130 captures the commonality of features between events, and can be derived from content-based analysis at the image level or event-based analysis at the event level or both. In one embodiment, three main features obtained at the event level are used—day of the week, event category, and location—that show good correlation within events from the same recurring group to perform the event signature based filtering as shown in FIG. 3.

Figure 3:
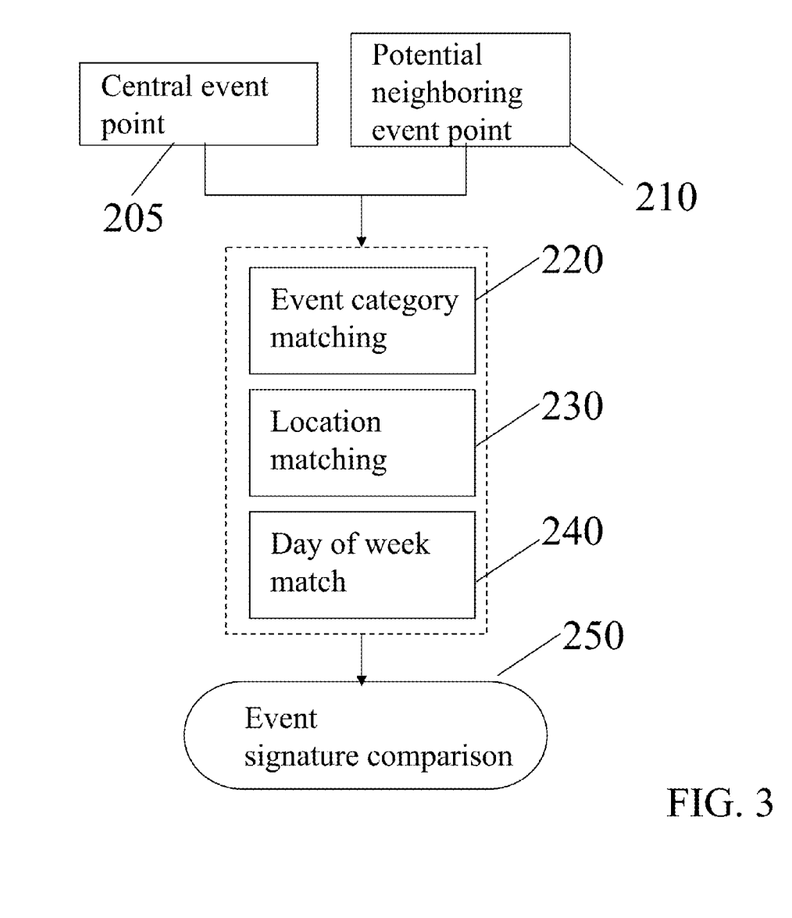
FIG. 3 is a more detailed flowchart of the event signature generation shown in block 130 of FIG. 2.

Referring to FIG. 3, when the neighborhood of one central event point 205 is being considered, other event points 310 in its neighborhood 210 are processed one at a time as follows. Event category matching 220 determines if the potential neighboring event point 210 has the same event category label as the central point 205. In the preferred embodiment, the method described in *Event Classification in Personal Image Collections* by Das and Loui, IEEE Intl. Workshop on Media Information Analysis for Personal and Social Applications at ICME 2009 is used to provide a broad event category ("Vacation", "Party", "Sports" or "Family Moment") for each event. In this method, a variety of high-level visual and temporal features that show good correlation with the event class are used to train a Bayesian belief network for event classification that computes the a posteriori probability of the event class given the input features.

A location matching module 230 checks if the potential neighboring event point 210 can be co-located with the central event point 205. The location where an event occurs is an important factor when determining whether it forms a recurring group with other events. Many recurring groups contain events that occur in the same locality. In the absence of GPS information, the event locations are matched using SIFT features as described by Das et al in "*Event-based Location Matching for Consumer Image Collections*" in the Proceedings of the ACM Int. Conf. on Image and Video Retrieval, 2008. In this method, events in consumer image collections are matched by location using SIFT features to match automatically detected unusual objects present in the scene. Using this method, if there is a positive scene match between the two events, their location is considered to have matched. It should be noted that if two events could not be matched using the scene-based method referenced above, it does not indicate that the events could not have been captured at the same location. Events can fail to be matched because there are no unique or unusual objects that are captured in images from both events. However, positive matches strongly indicate that the events were captured at the same location. When GPS-based location is available for matching, these are used to determine whether two events can have occurred at the same location. However, even in this case, a negative match does not exclude the possibility of belonging to the same recurring group. A user may take regular vacations to a particular region, forming a recurring group, but they may be visiting different specific spots in the area. The region in which a recurring group can be said to be located can be very broad, e.g., Florida during spring break. Conversely, there can be distinctions in the event groups based on much finer granularity than the town where they are located, e.g., the user may consider "School" to be a different location than "Home," both of which are in the same town. In some instances, the location information can be irrelevant. For example, birthday parties are usually celebrated in the user's home town, but some can be at home and others can be at some special location. Therefore, only positive matches are included in the event signature comparison.

The day of week is used as a part of the event signature-based filter because in studies of consumer media collections, a significant association was found between members of the same recurring event group and the day of the week the event occurred, e.g. events from the same group could all occur on Sunday. Many holidays are tied to the day of the week, e.g., Easter, Thanksgiving (US). Typically, there are more picture-taking activities near and during the weekend. Given this distribution of events, Friday through Monday are kept as unique choices, and merge Tuesday through Thursday into the "weekday" label. The day of week match 240 determines if two events have the same day of week label described above. For multi-day events, any overlap of day of the week is considered to be a match.

Features derived from content-based analysis of images in the event can also be included in the event signature. One such example is people-based matching where the presence of common people in both events is determined using available facial recognition technology (such as "OKAO Vision" Face Sensing Technology from Omron). Matching a common object can provide another matching criterion. Common scene classification (such as beach, urban scene, or field) of the images in the two events can also be used as a matching criterion.

The event signature comparison block 250 generates the final decision on whether the potential neighboring event point 210 should be considered to be in the neighborhood of the central event point 205. The features described above that are included in the event signature 130 are not combined into a single value, as that is not meaningful in the given context. In addition, mismatches are not necessarily significant for any of the three features 220, 230, 240 discussed above. Instead, positive matches are meaningful, and these are noted. Equal weight is assigned to positive matches from any of the three features. For example, two events that occur on the same day of the week, have the same event category and the same location, would have an event signature-based match score of 3; whereas two events that occur on the same day of the week but have different event categories and no location match was found would have a score of 1. Events that have a score of at least 1 have passed the event signature filtering process. Therefore, for any given event, the points that are considered to be within its neighborhood are those that occurred on the same day of the week during the previous and next week, or those that have the same event category, or those that are captured in the same location in the given time period.

Figure 6A:
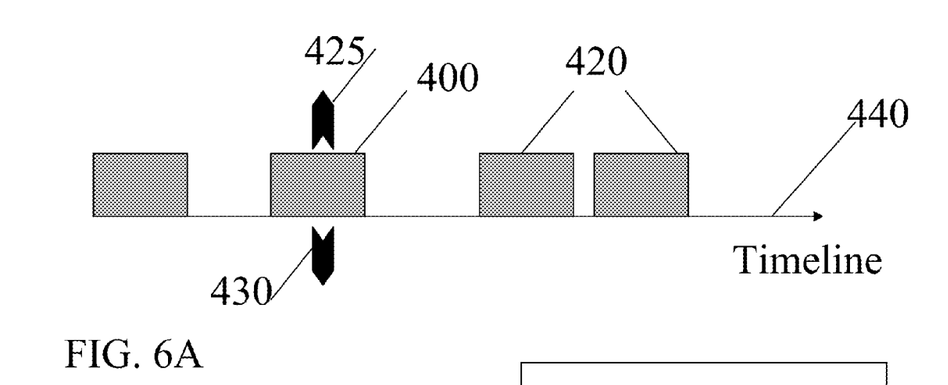
FIGS. 6A and 6B show two examples of displaying an organized collection showing the recurring event groups detected in the collection.
Figure 6B:
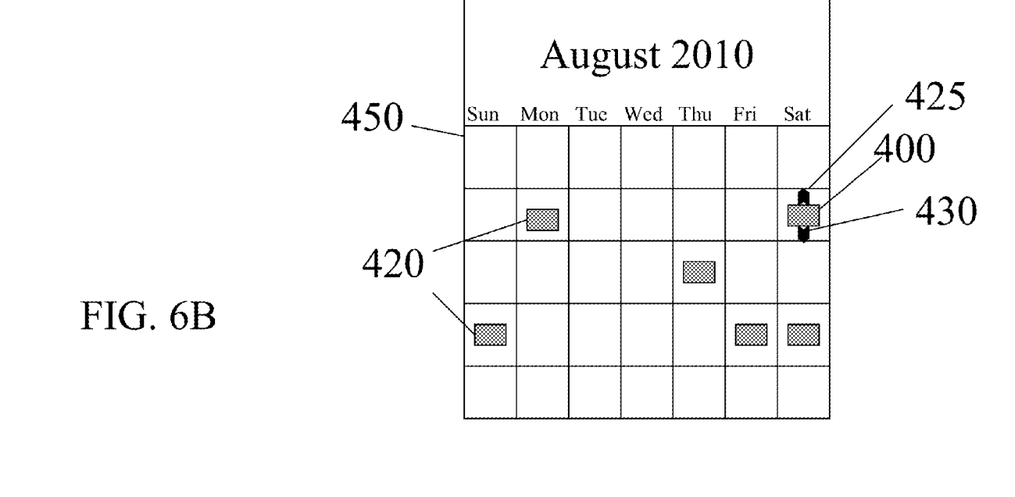

The clusters generated by the spatial clustering process 150 are output as recurring events 160 detected in the multi-year collection 110. The interpretation of these recurring events is based on the axes used in the multi-dimensional representation of the events. The images belonging to each recurring event are indexed so that they are linked to other images in the group. The recurring events are displayed to the user in an organized multi-year collection view. The events can be represented by a representative image or a collage of images from the event. Referring to FIGS. 6A and 6B, two common visualizations of an organized collection are shown—the timeline view 440 in FIG. 6A, and the calendar view 450 in FIG. 6B. The non-recurring events 420 are displayed on the timeline and in the calendar based on their date of occurrence. The recurring events 400 appear with icons 425, 430 that link to events in the previous and next time period in that recurring group. For example, a person's birthday event in 2010 would be linked to his birthday in 2009 and 2011. This formulation allows the user an easy access to related events that are separated by large time differences.

The invention has been described in detail with particular reference to certain preferred embodiments thereof, but it will be understood that variations and modifications can be effected within the spirit and scope of the invention.

PARTS LIST

10 Computer
20 Processor
30 Memory
50 Input device
60 Keyboard
70 Monitor
80 Network connection
110 Multi-year image collection
120 Event clustering module
130 Event signature-based filter module
140 Representing events in nD space step
150 Spatial clustering module
160 Recurring events detected
205 Central event point
210 Potential neighboring event point
220 Event category matching step
230 Location matching step
240 Day of week matching step
250 Event signature comparison step
310 Event point
320 Year number as y-axis
330 Day of year as x-axis
400 Recurring event
420 Non-recurring events
425 Icon indicating previous event in recurring group
430 Icon indicating next event in recurring group
440 Timeline view of organized collection
450 Calendar view of organized collection

The invention claimed is:

1. A method to detect recurring events in a digital image collection, comprising:
   identifying events in a collection of digital images based, at least in part, on content of the digital images, each event comprising at least one digital image, each digital image having capture time metadata;
   characterizing the identified events in a multi-dimensional representation including a representation having a first time axis and a second time axis that is different from the first time axis based, at least in part, on a distribution of the identified events' digital images' capture times; and
   identifying one or more recurring events from the identified events based, at least in part, on a spatial clustering analysis of the multi-dimensional representation of the events.

2. The method of claim 1, wherein the act of identifying events comprises identifying events based, at least in part, on color content of the digital images in the digital image collection.

3. The method of claim 2, wherein the act of identifying events based, at least in part, on content of the digital images comprises:
  partitioning a first of the digital images into a plurality of blocks;
  determining a color histogram for at least some of the first digital image's blocks;
  partitioning a second of the digital images into a plurality of blocks, wherein the second digital image's capture time follows the first digital image's capture time in succession;
  determining a color histogram for each of the second digital image's blocks that correspond to a block of the first digital image; and
  comparing the color histograms of the first digital image's blocks with the corresponding color histograms of the second digital image's blocks.

4. The method of claim 1, wherein the act of identifying events comprises identifying events based, at least in part, on foreground and background segmentation of digital images in the digital image collection.

5. The method of claim 1, wherein the act of identifying one or more recurring events comprises, at least in part, applying an event signature-based filter to the identified events.

6. The method of claim 5, wherein the act of identifying one or more recurring events comprises applying a spatial clustering analysis to only those identified events that pass the event signature-based filter.

7. A non-transitory program storage device comprising instructions stored thereon to cause one or more processors to:
  identify events in a collection of digital images based, at least in part, on content of the digital images, each event comprising at least one digital image, each digital image having capture time metadata;
  characterize the identified events in a multi-dimensional representation including a representation having a first time axis and a second time axis that is different from the first time axis based, at least in part, on a distribution of the identified events' digital images' capture times; and
  identify one or more recurring events from the identified events based, at least in part, on a spatial clustering analysis of the multi-dimensional representation of the events.

8. The non-transitory program storage device of claim 7, wherein the instructions to cause one or more processors to identify events comprise instructions to cause one or more processors to identify events based, at least in part, on color content of the digital images in the digital image collection.

9. The non-transitory program storage device of claim 8, wherein the instructions to cause one or more processors to identify events based, at least in part, on content of the digital images comprise instructions to cause one or more processors to:
  partition a first of the digital images into a plurality of blocks;
  determine a color histogram for at least some of the first digital image's blocks;
  partition a second of the digital images into a plurality of blocks, wherein the second digital image's capture time follows the first digital image's capture time in succession;
  determine a color histogram for each of the second digital image's blocks that correspond to a block of the first digital image; and
  compare the color histograms of the first digital image's blocks with the corresponding color histograms of the second digital image's blocks.

10. The non-transitory program storage device of claim 7, wherein the instructions to cause one or more processors to identify events further comprise instructions to cause one or more processors to identify sub-events among the digital images having identified events.

11. The non-transitory program storage device of claim 7, wherein the instructions to cause one or more processors to identify events comprise instructions to cause one or more processors to identify events based, at least in part, on foreground and background segmentation of the digital images in the digital image collection.

12. The non-transitory program storage device of claim 7, wherein the instructions to cause one or more processors to characterize the identified events comprise instructions to cause one or more processors to characterize the identified events based, at least in part, on a two dimensional distribution of the identified events' digital images' capture times.

13. The non-transitory program storage device of claim 7, wherein the instructions to cause one or more processors to identify one or more recurring events comprise instructions to cause one or more processors to apply an event signature-based filter to the identified events.

14. The non-transitory program storage device of claim 13, wherein the instructions to cause one or more processors to identify one or more recurring events comprise instructions to cause one or more processors to apply a spatial clustering analysis to only those identified events that pass the event signature-based filter.

15. The non-transitory program storage device of claim 13, wherein the event signature-based filter is based, at least in part, on a Bayesian belief network-based event classification.

16. A computer system, comprising:
  memory;
  a display communicatively coupled to the memory; and
  one or more processors operatively coupled to the memory and display and configured to execute instructions stored in the memory to—
    identify events in a collection of digital images stored in the memory based, at least in part, on content of the digital images, each event comprising at least one digital image, each digital image having capture time metadata,
    characterize the identified events in a multi-dimensional representation including a representation having a first time axis and a second time axis that is different from the first time axis based, at least in part, on a distribution of the identified events' digital images' capture times, and
    identify one or more recurring events from the identified events based, at least in part, on a spatial clustering analysis of the multi-dimensional representation of the events.

17. The computer system of claim 16, further comprising instructions stored in the memory to cause the one or more processors to identify at least one of the identified events and the event's corresponding digital images on the display.

* * * * *